United States Patent [19]

Clevenger

[11] Patent Number: 4,831,752

[45] Date of Patent: May 23, 1989

[54] MOUNTING ARRANGEMENT FOR SNOWPLOW BLADE CONTROL SWITCHES

[76] Inventor: Dennis L. Clevenger, 6511 NW. Ames Dr., Kansas City, Mo. 64118

[21] Appl. No.: 733,384

[22] Filed: May 13, 1985

[51] Int. Cl.$^4$ .............................................. E01H 5/04
[52] U.S. Cl. ..................................... 37/234; 74/471 R; 200/61.54
[58] Field of Search ............. 37/234, 266, 124, 126 R, 37/129; 74/47 R, 473 R, 473 SW, 473 P, 879, 523; 200/61.28, 61.54, 61.88, 158 H, 157, 52 A, 52 R

[56] References Cited

U.S. PATENT DOCUMENTS

| | | | |
|---|---|---|---|
| 1,484,239 | 2/1924 | Spiro | 200/61.54 |
| 2,337,108 | 12/1943 | Jensen | 37/232 |
| 2,863,015 | 12/1958 | Ahrens | 200/61.54 |
| 4,554,751 | 11/1985 | Nicolosi et al. | 37/234 |

FOREIGN PATENT DOCUMENTS 1005743  9/1965  United Kingdom ............. 200/61.54

Primary Examiner—E. H. Eickholt
Attorney, Agent, or Firm—Kokjer, Kircher, Bradley, Wharton, Bowman & Johnson

[57] ABSTRACT

A mounting arrangement for the control switches that control the height and angle of a vehicle mounted snowplow blade. A bracket on which the switches are mounted is attached to the gearshift lever of the vehicle so that the switches are conveniently accessible to the driver of the vehicle. The bracket has a main plate on which the switches are mounted and a flange which is connected to the shift lever by an angle member on the flange and an opposing U-bolt. By tightening nuts on the U-bolt legs, the bracket is rigidly clamped on the shift lever. The angle member resists twisting of the bracket.

21 Claims, 1 Drawing Sheet

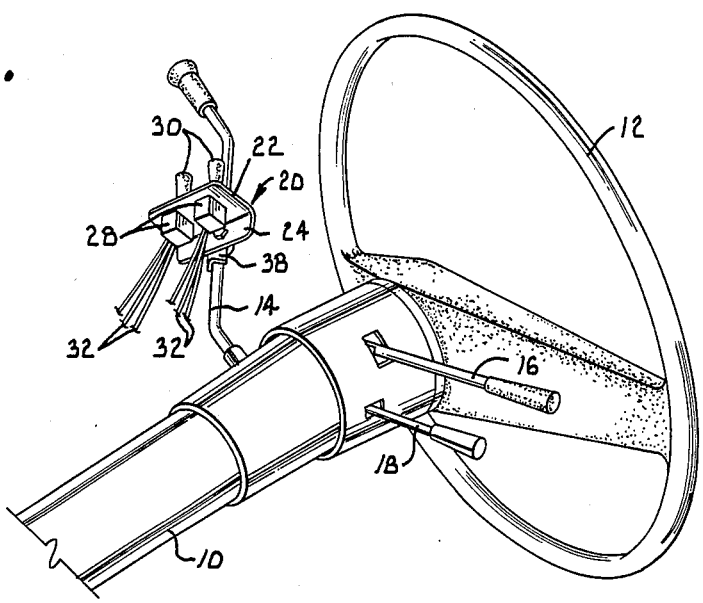
Fig. 1.
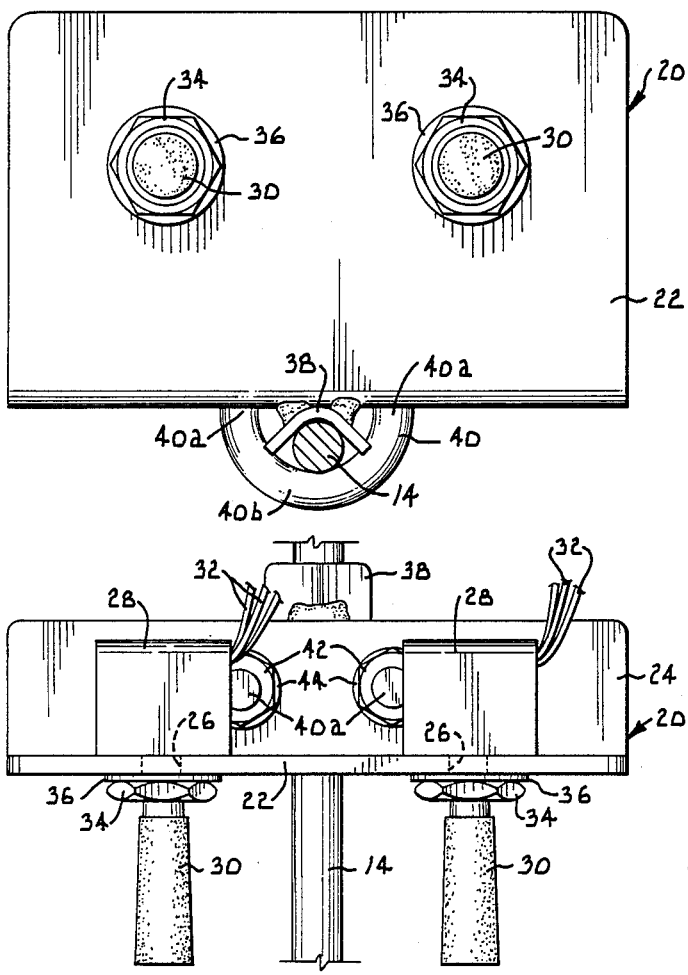
Fig. 2.
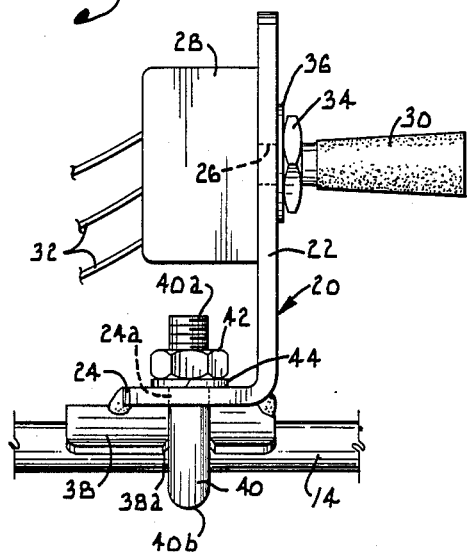
Fig. 3.
Fig. 4.

MOUNTING ARRANGEMENT FOR SNOWPLOW BLADE CONTROL SWITCHES

BACKGROUND AND SUMMARY OF THE INVENTION

This invention relates in general to vehicle mounted snowplow blades and deals more particularly with a mounting bracket which is used to mount the snowplow blade control switches on the shift lever of the vehicle.

Vehicles such as pickup trucks and other relatively small trucks can be equipped with detachable snowplow blades which permit the vehicle to be used for clearing snow from streets, driveways, parking lots and other surfaces. Normally, the height and angle of the blade can be varied to control the "float" of the blade and its angle relative to the direction of movement of the vehicle. Hydraulic cylinders usually raise and lower the blade and adjust its angle. The cylinders are in turn controlled by electric switches that are located within the cab of the vehicle so that the driver can make the blade adjustments from his seat within the cab.

The switches are typically mounted on the dashboard of the vehicle where access to them is somewhat difficult. In order to vary the blade height or angle, it is necessary for the driver of the vehicle to reach forward and operate the appropriate dash mounted switch. At least one hand of the driver must be kept on the steering wheel, and the other hand is often on the gear shift lever since it is necessary to frequently back the vehicle up and then go forward and to shift between gears for other reasons during the course of snowplowing operations. The need for the driver to reach the dashboard in order to activate the snowplow switches is thus a considerable inconvenience which has resulted in the blade not always being adjusted to the most desirable height and angle. The snowplowing operations have suffered accordingly.

The present invention is directed to a mounting bracket which permits the snowplow control switches to be mounted on the gear shift lever where they are readily accessible to the vehicle driver at all times because he normally has one hand on the shift lever and it is a simple matter for him to reach the nearby switches. Consequently, the inconvenience associated with dash mounted snowplow switches is eliminated by the switch mounting arrangement of the present invention. To my knowledge, there have been no brackets available in the past which permit the snowplow control switches to be mounted on the shift lever of a vehicle.

In accordance with my invention, a metal bracket includes a main plate and a flange which is bent at a right angle to the plate. A pair of holes are provided in the plate to permit the switches to be mounted thereto with the toggle switch actuators extending through the holes and secured to the plate by nuts. The flange is provided with a small angle member which closely fits on the shift lever, whether it is mounted on the steering column or floor of the vehicle. A U-bolt has its curved bight opposing the angle member, and the U-bolt can be tightened by nuts to clamp the shift lever between its bight and the angle member. This rigidly yet detachably mounts the bracket on the shift lever with the switch actuators projecting generally toward the driver of the vehicle where they are easily accessible to make adjustment of the snowplow blade more convenient than in the case of dash mounted switches.

The mounting bracket and related components are constructed in a simple and economical manner, and the bracket can be easily installed on the shift lever without the need for special skills or special tools. Another feature of the invention is the ability of the bracket to be mounted on shift levers having various sizes and styles and also on shift levers that are mounted either on the steering column or on the floor or console of the vehicle. The bracket and related components do not interfere with normal operation of the vehicle and at the same time make adjustment of the snowplow blade much more convenient than has been possible in the past.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view showing the switch mounting bracket of the present invention attached to a shift lever located on a steering column;

FIG. 2 is a front elevational view of the mounting bracket on an enlarged scale;

FIG. 3 is an end elevational view of the mounting bracket; and

FIG. 4 is a top plan view of the mounting bracket.

Referring now to the drawing in more detail and initially to FIG. 1, numeral 10 designates a steering column on which a steering wheel 12 is mounted. The steering wheel is located within the cab of a pickup truck or other vehicle equipped with a snowplow blade (not shown) which is used to clear snow from streets and other surfaces. Mounted on the steering column 10 is a conventional gear shift lever 14 which is used in the shifting of gears, along with additional levers 16 and 18 used to operate accessories such as turn signals and the tilt mechanism of the steering wheel.

In accordance with the present invention, a mounting bracket 20 is detachably mounted on the shift lever 14 in order to locate the control switches for the snowplow blade at a convenient and accessible position. The mounting bracket 20 is preferably formed from a metal plate, and it may be painted or otherwise finished in an attractive manner.

As best shown in FIGS. 2-4, a rectangular plate 22 forms the main body of the mounting bracket on which the switches are mounted. A flange 24 is bent from the lower edge portion of plate 22 at a right angle and is used to mount the plate to the shift lever 14, as will be described more fully.

A pair of openings 26 (see FIG. 4) are formed through plate 22 to accommodate mounting of the control switches. Each switch includes a box-like switch body 28 and a finger operated switch actuator 30 which extends from the switch body 28. The actuators 30 are preferably toggle devices. Electrical wiring 32 extends from each switch body 28 to the solenoid valves or other controls for the hydraulic cylinders (not shown) which control the height and angle of the snowplow blade. The wiring 32 preferably extends along the steering column 10 and may be connected thereto by straps or wire ties (not shown).

The switches are mounted to plate 22 by extending the switch actuators 30 through the openings 26 until the switch bodies 28 are located against the rear face 22a of plate 22. The switch actuators 30 then extend forwardly well beyond the front face 22b of plate 22. Nuts 34 and washers 36 are applied to the shank portions of the switch actuators 30, and the nuts are tightened against the front face 22b in order to secure the switches in place on bracket 20 with the switch bodies 22 disposed against the rear surface 22a of plate 22.

An inverted angle member 38 is welded to the lower side of the flange 24. The angle member 38 is small enough to fit closely on the shift lever 14, as best shown in FIG. 2. One end of angle member 38 is located adjacent to the plate 22, while the other end extends beyond the free edge of flange 24, as best shown in FIG. 3. The length of angle member 38 and its close fit on the shift lever 14 prevents bracket 20 from twisting on the shift lever.

A U-bolt 40 has its two leg portions 40a extended through openings 24a (FIG. 3) in flange 24 located on opposite sides of the angle 38. The U-bolt has a curved bight portion 40b which is located below the shift lever 14 in opposition to the downwardly facing trough presented by angle 38. Notches 38a are formed in the free edges of the flanges which form angle 38 in order to accommodate the U-bolt 40 and permit it to be fully tightened on the shift lever. A nut 42 and washer 44 are applied to each leg 40a of the U-bolt. The nuts 42 are threaded onto the U-bolt and may be tightened to draw the bight 40b toward angle 38, thereby rigidly clamping the shift lever between the angle 38 and the opposing bight 40b of the U-bolt.

In use of the mounting bracket 20, the control switches are attached in the manner indicated to the plate 22. The bracket is installed on shift lever 14 by applying the angle 38 to the top of the shift lever. The U-bolt is then applied and nuts 42 are tightened until the bracket is rigidly clamped in place on lever 14 in a stationary position. The angle 38 prevents the bracket from twisting when forces are applied to it, and the plate 22 extends away from the shift lever 14 and is generally perpendicular to it. The switch actuators 30 project from plate 22 and are generally parallel to the shift lever 14 where they are conveniently accessible to the driver of the vehicle.

In use, the switches are operated by the driver in order to adjust the height of the snowplow blade and its angle. By raising one of the switch actuators 30, the blade is raised, while lowering of the same actuator causes the blade to lower. By positioning the actuator in its normal neutral position, the height of the blade is maintained. The angle of the blade can be adjusted by moving the other switch actuator 30 to the left or right, depending upon which direction the blade is to be angled. In the normal neutral position, the angle of the blade is maintained.

The driver of the vehicle frequently has to move the vehicle forward and then back it up, and other gear changes are also frequently necessary. Consequently, mounting the control switches on the shift lever 14 makes them conveniently accessible to the driver because his hand is often on the shift lever 14 and the switch actuators 30 are adjacent to the shift lever where it is a simple matter for the driver to reach them. At the same time, surface 22b of plate 22 faces generally toward the driver so that the switch actuators 30 project generally toward him for convenient access.

If the snowplow blade is to be removed from the vehicle or if the control switches are no longer needed for some other reason, the bracket 20 can be quickly and easily removed from the shift lever 14. Removal only requires that the nuts 42 be loosened so that the bracket can be detached from the shift lever. Installation of the bracket can likewise be carried out in a quick and easy manner. The only tool that is required is a conventional wrench for tightening and loosening of the nuts 42. The switches can be removed from bracket 20 by loosening the nuts 34 and slipping the switch actuators 30 through the openings 36 in plate 22.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a vehicle having a snowplow blade thereon, a shift lever therein for shifting gears and a pair of control switches each including a body and a switch actuator for controlling the height and angle of the blade, a switch mounting arrangement comprising:
   a bracket plate having opposite sides and a pair of openings;
   means for mounting the switches on said bracket plate with the switch bodies adjacent one side thereof and the actuators extending through said openings and projecting generally away from the other side of the bracket plate; and
   means for detachably connecting said bracket plate to the shift lever in an orientation wherein said other side of the bracket plate faces generally toward an operator of the vehicle to make the switch actuators conveniently accessible to the operator.

2. The invention of claim 1, wherein said bracket plate has a flange projecting therefrom and occupying a plane oriented substantially perpendicular to said bracket plate.

3. The invention of claim 2, wherein said detachable connection means includes:
   a U-bolt connected with said flange; and
   means for tightening said U-bolt against the shift lever to clamp the lever between said flange and U-bolt.

4. The invention of claim 2, wherein said detachable connection means includes:
   an angle member on said flange having a size to fit closely on the shift lever; and
   means for clamping said angle member rigidly against the shift lever to connect said flange thereto.

5. The invention of claim 4, wherein said clamping means includes:
   a U-bolt connected with said angle member and having a curved bight opposing the angle member; and
   means for tightening said U-bolt to clamp same against the shift lever in opposition to said angle member, thereby clamping the bracket on the shift lever.

6. Apparatus for substantially simultaneously controlling both a transmission of a vehicle to change the forward and reverse directions of movement of the vehicle, and lateral and/or elevational movement of a snow plow mounted to the vehicle, said apparatus comprising:
- a lever for choosing a pre-defined one of a plurality of gears in said transmission to change the forward and reverse directions of movement of the vehicle, wherein one end of said lever is adapted to be grasped by a single hand of a driver of said vehicle, and
- a selector for controlling the movement of said snow plow, wherein said selector is attached to said lever and situated in sufficient proximity to the end of the lever so that the driver is not required to substantially release the grasp of said single hand from the end of the lever in order to actuate said selector and thereby cause the snow plow to move in a desired direction.

7. A mounting arrangement for hand operated control switches which control a snowplow blade carried on a vehicle having a shift lever, said mounting arrangement comprising:
- a mounting bracket;
- means for mounting the control switches on said bracket; and
- means for detachably connecting said mounting bracket to the shift lever in a manner to locate the switches adjacent the lever in a stationary position conveniently accessible to an operator of the vehicle.

8. The invention of claim 7, wherein said detachable connection means includes:
- a U-bolt connected with said bracket; and
- means for tightening said U-bolt against the shift lever to clamp the lever between said bracket and U-bolt.

9. The invention of claim 7, wherein said detachable connection means includes:
- an angle member on said bracket having a size to fit closely on the shift lever; and means for clamping said angle member rigidly against the shift lever to connect the bracket thereto.

10. The invention of claim 9, wherein said clamping means includes:
- a U-bolt connected with said angle member and having a curved bight opposing the angle member; and
- means for tightening said U-bolt to clamp same against the shift lever in opposition to said angle member, thereby clamping the bracket on the shift lever.

11. The invention of claim 10, wherein said tightening means includes a pair of nuts threaded onto opposite end portions of the U-bolt and being adapted to be tightened in threaded fashion against the bracket to clamp the U-bolt and angle member on the shift lever.

12. The invention of claim 7, wherein said mounting bracket includes:
- a generally planar plate on which the switches are mounted; and
- a flange on said plate projecting therefrom, said detachable connection means connecting said flange to the shift lever.

13. The invention of claim 12, wherein:
- said plate includes opposite sides and a pair of openings;
- the switches each include a switch body and a switch actuator projecting from the switch body; and
- said mounting means mounts each switch body against one side of said plate with the actuators extending through said openings and projecting away from the opposite side of said plate.

14. The invention of claim 12, wherein said detachable connection means includes:
- a U-bolt connected with said flange; and
- means for tightening said U-bolt against the shift lever to clamp the lever between said flange and U-bolt.

15. The invention of claim 12, wherein said detachable connection means includes:
- an angle member on said flange having a size to fit closely on the shift lever; and
- means for clamping said angle member rigidly against the shift lever to connect said flange thereto.

16. The invention of claim 15, wherein said clamping means includes:
- a U-bolt connected with said angle member and having a curved bight opposing the angle member; and
- means for tightening said U-bolt to clamp same against the shift lever in opposition to said angle member, thereby clamping the bracket on the shift lever.

17. The invention of claim 16, wherein said tightening means includes a pair of nuts threaded onto opposite end portions of the U-bolt and being adapted to be tightened in threaded fashion against the bracket to clamp the U-bolt and angle member on the shift lever.

18. A mounting bracket for mounting hand operated control switches for a vehicle mounted snowplow blade on a shift lever within the vehicle, said mounting bracket comprising:
- a generally planar plate to which the switches are mounted;
- a flange on said plate projecting therefrom and occupying a plane offset from the plane occupied by the plate; and
- means for detachably connecting said flange to the shift lever in a manner to locate said plate in projection generally away from the shift lever with the switches in a stationary position conveniently accessible to an operator of the vehicle.

19. The invention of claim 18, wherein said detachable connection means includes:
- a U-bolt connected with said flange; and
- means for tightening said U-bolt against the shift lever to clamp the lever between said flange and U-bolt.

20. The invention of claim 18, wherein said detachable connection means includes:
- an angle member on said flange having a size to fit closely on the shift lever; and
- means for clamping said angle member rigidly against the shift lever to connect said flange thereto.

21. The invention of claim 20, wherein said clamping means includes:
- a U-bolt connected with said angle member and having a curved bight opposing the angle member; and
- means for tightening said U-bolt to clamp same against the shift lever in opposition to said angle member, thereby clamping the bracket on the shift lever.

* * * * *